United States Patent
Liu et al.

(10) Patent No.: US 7,680,547 B2
(45) Date of Patent: Mar. 16, 2010

(54) METHOD, SYSTEM AND COMPUTER PROGRAM FOR GENERIC SYNCHRONIZED MOTION CONTROL FOR MULTIPLE DYNAMIC SYSTEMS

(76) Inventors: Hugh H. T. Liu, 135 Shirley Drive, Richmond Hill, Ontario (CA) L4S 1Y7; Jinjun Shan, 40 Godstone Road, Apt. 1208, Toronto, Ontario (CA) M2J 3C7

( * ) Notice: Subject to any disclaimer, the term of this patent is extended or adjusted under 35 U.S.C. 154(b) by 584 days.

(21) Appl. No.: 11/448,921

(22) Filed: Jun. 8, 2006

(65) Prior Publication Data

US 2007/0288101 A1    Dec. 13, 2007

(51) Int. Cl.
*G06F 19/00* (2006.01)
(52) U.S. Cl. .............................. 700/19; 700/245
(58) Field of Classification Search .......... 700/19, 700/61, 86, 245; 74/490
See application file for complete search history.

(56) References Cited

U.S. PATENT DOCUMENTS 5,832,188 A * 11/1998 Papiernik .............. 700/245
6,510,361 B1 * 1/2003 Govindaraj et al. ......... 700/180
2004/0002778 A1 * 1/2004 Giamona et al. ........... 700/61
2006/0109376 A1 * 5/2006 Chaffee et al. ........... 348/423.1
2006/0144187 A1 * 7/2006 Maeda .................. 74/567

OTHER PUBLICATIONS

Bong et al., Robust synchronizing motion Control of Twin-Servo Systems Based on Network Modeling, 2000, Robotic & Biomechatronic Lab., IEEE, p. 1019-1024.*
Kalervo Nevala, Winding Arms Motion Control Method Based on the Dynamic Model of the Paper Winder, 1994, VTT Automation, IEEE, p. 746-749.*
Zhanming et al., The Synchronized Coordinated Control of Tripartite Hydraulic Lifting Platform, Gansu Unversity of Technology, p. 1456-1458.*

* cited by examiner

*Primary Examiner*—Kidest Bahta (57) ABSTRACT

The present invention provides a generic synchronized motion control system for multiple dynamic systems. Free choices of synchronization strategies are allowed with no implementation modification. Furthermore, synchronization selections are converted into a numerically searchable parameter space that enables systematic development, automated process, and performance optimization. In addition, the present invention enables a uniform computer program of control synchronization algorithm due to its innovation of separating synchronization strategy from control implementation.

30 Claims, 2 Drawing Sheets

METHOD, SYSTEM AND COMPUTER PROGRAM FOR GENERIC SYNCHRONIZED MOTION CONTROL FOR MULTIPLE DYNAMIC SYSTEMS

FIELD OF THE INVENTION

The present invention relates to the field of motion synchronization. In particular, the present invention relates to the field of motion synchronization for multiple dynamic systems.

BACKGROUND OF THE INVENTION

Reference to background documents indicated by the square brackets [ ] refer to the "List of References" provided below.

With the ever-increasing demand for efficiency and flexibility, many engineering intensive applications opt to use multi-composed systems to conduct cooperative tasks. Such applications are widely spread across industry sectors, e.g., the multi-robot systems in automotive industry, the multi-actuated platforms in manufacturing, and formation flying of multiple flight vehicles or spacecraft (satellites) in aerospace, etc. The cooperative behavior for these multiple dynamic systems provides flexibility and maneuverability that cannot be achieved by an individual system. One key element to the success of such coordination is the motion synchronization among these involved components or systems. Motion synchronization addresses the cooperative or coordinated schemes of multi-composed systems when they work in an integrated fashion and are required to show the same kind of dynamic behavior. It requires high accuracy regulation of motion states such as the position, velocity and orientation. Therefore, the challenge lies in providing synchronized control strategy and real-time communications among the multi-composed systems.

Motion synchronization has been studied for a number of axes or motors in manufacturing process. A cross-coupling concept was proposed in early 1980s [1] where errors between systems (coupled errors) are to be synchronized. Since then, efforts of using this concept to improve synchronization performance of two-axis motions include the work of Kulkarni [2] and Kamano [3]. Other approaches include fuzzy logic coupling [4] and use of neuro-controllers [5]. Much of recent work can be found in the field of coordinated robots and multiple UAVs in formation flying, such as Jadbabaie [6], Beard [7], Angeles [8], and Lau [9].

With respect to flying vehicles, U.S. Pat. No. 6,271,768 to Frazier, Jr. et al. describes a system for avoiding traffic collisions, involving the cooperation of a follower aircraft in conjunction with lead aircraft. Data between the aircrafts are shared to coordinate flight.

Similarly, U.S. Pat. No. 6,718,236 issued to Hammer et al. teaches a method of trajectory planning and prediction among vehicles in their coordinated maneuver. The approach involves receiving and using the state data of numerous vehicles to coordinate them within a common maneuver. In this aspect, the approach is focused on predicting the trajectory states of the vehicles to conduct the coordinated maneuvers. However, what is not addressed is how to adjust to maintain such maneuvers, when coordination is slightly deviated and under disturbance. In other words, said prior art disclosure does not provide an automated control approach.

In general, a synchronized control approach using the cross-coupling strategy takes tracking actions by feeding back synchronization errors such as coupling errors. It creates interconnections that render mutual synchronization of involved multi-system motions. The strategy ensures stability and simultaneous convergence. However, there are still limitations in its implementation and operations.

First of all, there are many alternatives in selecting proper coupling errors for motion control. For example, one can compare its relative position with every other object in the system, or in some cases only the relative positions between the neighbouring systems are of interest. Obviously, different choices of coupling errors will lead to different synchronized control algorithms. Quite often it is difficult to predict which choice is better suited for a specific application in terms of dynamic performance before it is implemented and tested. However, changing the coupling error selections and the corresponding synchronizing control algorithms generally involves fundamental architecture modifications in the context of prior art solutions. It is a time-consuming and expensive task, and for some applications not financially viable. In these situations, the design suffers from performance degradation due to an early-stage selection mistake. Unfortunately, such a mistake is almost impossible to avoid upfront.

Secondly, one may argue that collecting all synchronization information possible among the systems will be more accurate and exhaustive, and will lead to better motion synchronization control. While this might be true in theory, in practice this will likely suffer from computational complexity that prevents the proposed controller from implementation. Given these realities, one needs to find a balance in trade-off between the synchronization strategies and their practical affordability.

In view of the foregoing, what is needed is a motion control method that overcomes limitations of prior art in terms of ad hoc selection of synchronization strategy, challenges in implementation modification, and trial-and-error evaluation of dynamic performance. In particular, what is needed is a uniform framework of motion synchronization.

SUMMARY OF THE INVENTION

The present invention provides a generic control method to synchronize motions among multiple dynamic systems in performing coordinated dynamic tasks.

In an aspect of the present invention, a generic motional control synchronization framework is provided, which incorporates a uniform control framework. Specifically, the generic synchronization framework is based on an adaptive control strategy. By operation of the generic synchronization framework of the present invention, free choices of synchronization strategies are allowed without a need to implement modifications to the control framework per se. In accordance with the present invention, synchronization selections are converted into numerical parameters (such as specified quantities or constraints related to the multiple dynamic systems) that define a numerically searchable parameter matrix thereby enabling systematic development, automated processes, and dynamic performance optimization.

In motion synchronization control, the designer's objectives are: 1) to achieve the asymptotic convergence of tracking and synchronization errors simultaneously; 2) to achieve the above object under acceptable control efforts; and 3) to reach the best transient performance possible. The present invention ensures the objective 1) by providing the generic control framework of the present invention combined with the adaptive control strategy. Accordingly, the generic control framework provides a feasible space defined by the parameter matrix in which each member of such parameter matrix is a feasible solution, thereby permitting simultaneous convergence to be achieved. Furthermore, objectives 2) and 3) can be accomplished by searching the feasible space for better (or optimal) solution, using numerical optimization methods that are known. The operation of the present invention is demonstrated in motion synchronization among multiple flying vehicles, however, the present invention is operable for many other coordinated systems applications.

According to another aspect of the present invention, in the case where there exist physical constraints of the synchronization choices, for example, due to space limit or signal availability, one can simply choose the parameter matrix under the uniform framework with specified quantities and constraints. One can still improve the design, by performing a constrained optimization process.

In another aspect of the present invention, a motion control synchronization system is provided that is operable to synchronize motions among multiple dynamic systems in performing coordinated dynamic systems based on the generic motion control synchronization framework of the present invention.

In yet another aspect of the present invention a motion control synchronization computer program is provided that is operable to provide the generic motion control synchronization framework of the present invention.

The generic motion control synchronization framework of the present invention, which enables a synchronized control strategy, has many potential applications, including but not limited to the aerospace (formation flying of unmanned aerial vehicles and satellites), automobile (coordinated control of intelligent cars) and manufacturing (multi-axis control) industries.

A method for synchronizing motion for at least two dynamic systems comprising: providing a generic motion control synchronization framework, the generic synchronization framework defining a parameter matrix and a uniform control framework, the generic synchronization framework being operable to perform adaptive control of a plurality of synchronization parameters related to the motion of the at least two dynamic systems; populating the generic synchronization framework with the synchronization parameters; and determining a solution for the parameter matrix adaptively, thereby obtaining a solution for synchronizing motion of the dynamic systems A system for synchronizing motion between at least two dynamic systems, the system comprising: a computer device; and a computer program linked to the computer device, computer device and computer program being operable to: define a generic motion control synchronization framework, the generic synchronization framework being operable to establish a parameter matrix and a uniform control framework, the generic synchronization framework being operable to perform adaptive control of a plurality of synchronization parameters related to the motion of the at least two dynamic systems; populate the generic synchronization framework with the synchronization parameters; and determine a solution for the parameter matrix adaptively, thereby obtaining a solution for synchronizing motion of the dynamic systems.

A computer program product for use on a computer device for synchronizing motion for at least two dynamic systems, the computer program product comprising: a computer usable medium; and computer readable program code recorded or storable in the computer useable medium, the computer readable program code defining a control application on the computer device that is operable to: define a generic motion control synchronization framework, the generic synchronization framework being operable to establish a parameter matrix and a uniform control framework, the generic synchronization framework being operable to perform adaptive control of a plurality of synchronization parameters related to the motion of the at least two dynamic systems; populate the generic synchronization framework with the synchronization parameters; and determine a solution for the parameter matrix adaptively, thereby obtaining a solution for synchronizing motion of the dynamic systems.

A method for synchronizing motion between at least two dynamic systems, comprising the steps of: developing a dynamic model of the dynamic systems; obtaining estimates for selected synchronization parameters related to the motion of the dynamic systems, by operation of the dynamic model; populating a generic motion control synchronization framework with the synchronization parameters, the generic synchronization framework defining a parameter matrix and a uniform control framework, the generic synchronization framework being operable to perform adaptive control of the synchronization parameters related to the motion of the at least two dynamic systems; calculating selected synchronization errors based on the desired states and the actual states for the dynamic systems; and converting the selected synchronization errors are converted into the parameter matrix and adaptively applying synchronization strategies to the parameter matrix and solving the parameter matrix so as to obtain a solution to the selected synchronization errors.

BRIEF DESCRIPTION OF THE DRAWINGS

A detailed description of the preferred embodiment(s) is (are) provided herein below by way of example only and with reference to the following drawings, in which.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present invention is best understood by first referring to the dynamics of a dynamic system such as a motion system. These are illustrated with n components in the matrix format:

$$\underline{H}\ddot{x} + \underline{C}\dot{x} + \underline{F}(x, \dot{x}) = \underline{Y}\,\theta - \underline{\tau}$$

Where $$\underline{H} = \begin{bmatrix} H_1 & & \\ & \ddots & \\ & & H_n \end{bmatrix}, \underline{C} = \begin{bmatrix} C_1 & & \\ & \ddots & \\ & & C_n \end{bmatrix},$$

$$\underline{F} = \begin{bmatrix} F_1 \\ \vdots \\ F_n \end{bmatrix}, \theta = \begin{bmatrix} \theta_1 \\ \vdots \\ \theta_n \end{bmatrix}, \underline{x} = \begin{bmatrix} x_1 \\ \vdots \\ x_n \end{bmatrix}, \underline{\tau} = \begin{bmatrix} \tau_1 \\ \vdots \\ \tau_n \end{bmatrix},$$

$$\underline{Y} = \begin{bmatrix} Y_1 & & \\ & \ddots & \\ & & Y_n \end{bmatrix}.$$

For each ith component, Hi and Ci represent the inertia and centrifugal and Coriolis matrix respectively, and $\dot{H}_i - 2C_i$ is skew-symmetric; Fi represents the external disturbance.

Without loss of generality, the dynamics equations of each axis can be reformulated as $Y_i\theta_i=\tau_i$, where Yi is the regression matrix; θi represents the unknown parameters; and τi represents the torque that are to be designed for control.

As previously stated, the prior art approach to synchronization of motion control is (1) to select a strategy for defining a synchronization error between a plurality of dynamic systems identified for performance of coordinated dynamic tasks; (2) establishing the calculations corresponding to the applicable synchronization errors; and (3) implementing these calculations to the applicable motion control synchronization system. In accordance with prior art solutions, this implementation generally required customized implementation of the control system, i.e. modification of the controller which is time-consuming and expensive. Furthermore, it is often difficult to predict which synchronization strategy is better suited for a specific application.

The present invention overcomes limitations of prior art by providing a generic motion control synchronization framework, which incorporates a uniform control framework. Specifically, the generic synchronization framework is based on an adaptive control strategy. By operation of the generic synchronization framework of the present invention, free choices of synchronization strategies are allowed without a need to implement modifications to the control framework per se. In accordance with the present invention, synchronization selections are converted into numerical parameters (such as specified quantities or constraints related to the multiple dynamic systems) that define a numerically searchable parameter matrix. The parameter matrix includes choices of synchronization and their quantitative values, thereby enabling systematic development, automated processes, and dynamic performance optimization. The generic synchronization framework permits control strategy modifications without changing the overall architecture.

The present invention is best understood by describing the application of the method of the present invention to synchronization errors.

Typically, synchronizations error seeks the differences among the tracking errors of the multiple dynamic systems. For example, one can choose the synchronization errors as the error differences between the downstream pair of adjacent components, as shown in the following equation:

$$\epsilon_1 = e_1 - e_2$$
$$\epsilon_2 = e_2 - e_3$$
$$\vdots$$
$$\epsilon_i = e_i - e_{i+1}$$
$$\vdots$$
$$\epsilon_{n-1} = e_{n-1} - e_n$$
$$\epsilon_n = e_n - e_1$$

Or one may choose a difference strategy in synchronization error, such as the following one, where the synchronization errors are defined as the error differences among the adjacent components in both directions (upstream and downstream):

$$\epsilon_1 = 2e_1 - (e_2 + e_n)$$
$$\epsilon_2 = 2e_2 - (e_3 + e_1)$$
$$\vdots$$
$$\epsilon_i = 2e_i - (e_{i+1} + e_{i-1})$$
$$\vdots$$
$$\epsilon_{n-1} = 2e_{n-1} - (e_n + e_{n-2})$$
$$\epsilon_n = 2e_n - (e_1 + e_{n-1})$$

The generic synchronization framework is illustrated in connection with the definition of a generic synchronization error, which is given by $$\begin{bmatrix} \epsilon_1 \\ \vdots \\ \epsilon_n \end{bmatrix} = \begin{bmatrix} \Lambda_{11} & \cdots & \Lambda_{1n} \\ \vdots & \ddots & \vdots \\ \Lambda_{n1} & \cdots & \Lambda_{nn} \end{bmatrix} \begin{bmatrix} e_1 \\ \vdots \\ e_n \end{bmatrix}, \text{ or, } \epsilon = Te$$

To demonstrate the generality of this framework, the previous examples of synchronization error definitions can be re-written as special cases in the similar format as follows:

$$\begin{bmatrix} \epsilon_1 \\ \epsilon_2 \\ \vdots \\ \epsilon_{n-1} \\ \epsilon_n \end{bmatrix} = \begin{bmatrix} I & -I & & & \\ & I & -I & & \\ & & \ddots & \ddots & \\ & & & I & -I \\ -I & & & & I \end{bmatrix} \begin{bmatrix} e_1 \\ e_2 \\ \vdots \\ e_{n-1} \\ e_n \end{bmatrix}$$

$$\begin{bmatrix} \epsilon_1 \\ \epsilon_2 \\ \vdots \\ \epsilon_{n-1} \\ \epsilon_n \end{bmatrix} = \begin{bmatrix} 2I & -I & & & -I \\ -I & 2I & -I & & \\ & \ddots & \ddots & \ddots & \\ & & -I & 2I & -I \\ -I & & & -I & 2I \end{bmatrix} \begin{bmatrix} e_1 \\ e_2 \\ \vdots \\ e_{n-1} \\ e_n \end{bmatrix}$$

Obviously the generic framework offers more freedom of choices. It is important to understand that parameter matrix T is numerically searchable, thereby making it possible to improve or optimize performance, as well as setting constraints due to physical limitations of one specific application.

In addition, a standard format is preferably defined for control strategy elements such as control inputs. For example, in a particular embodiment of the present invention, the control input has the following standard format $$\tau = \hat{H}\dot{u} + \hat{C}u + \hat{F} + Rr + E\varepsilon = Y\hat{\theta} + Rr + E\varepsilon$$

thereby providing stability and simultaneous convergence.

Figure 1:
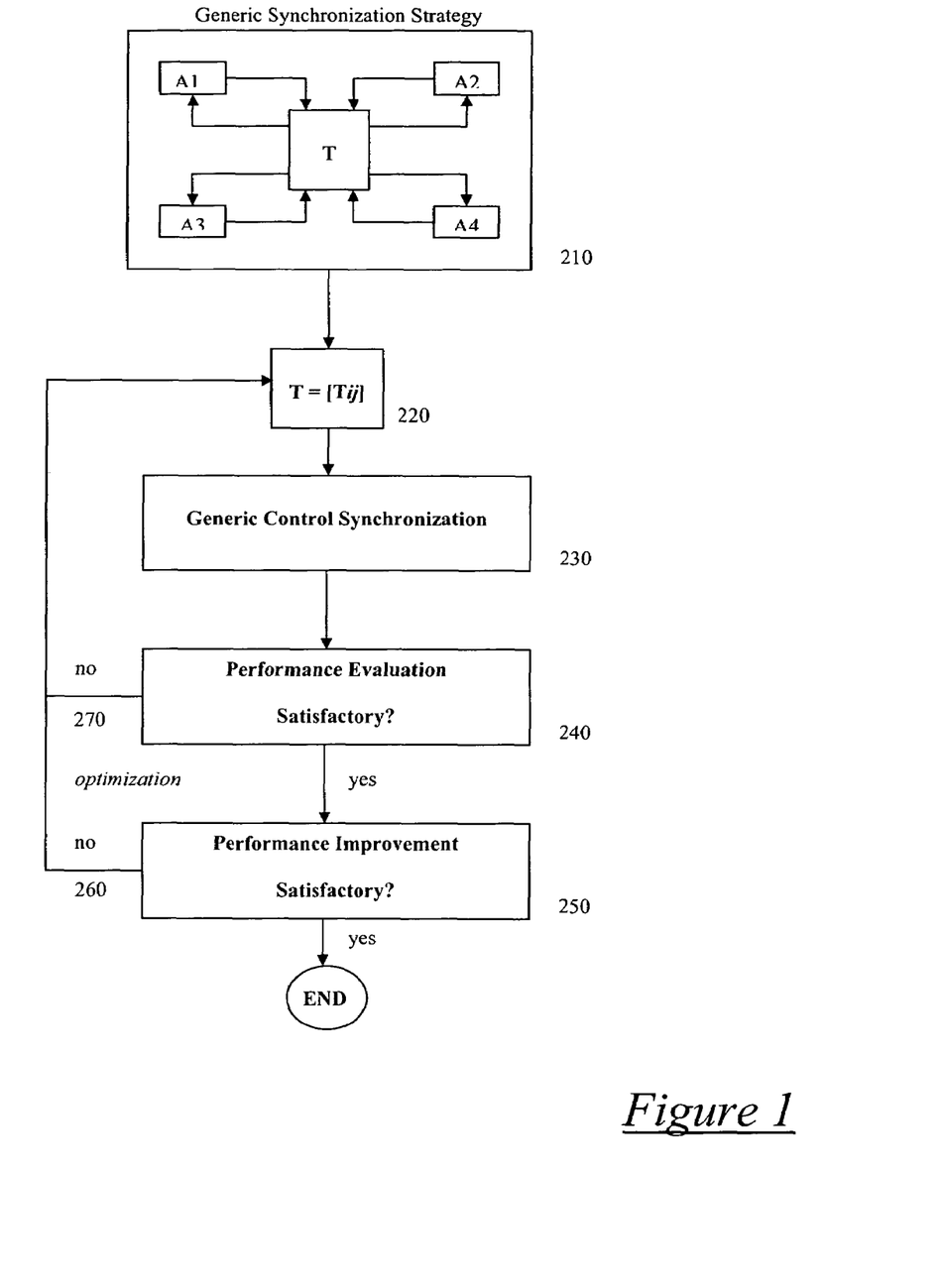
FIG. 1 is a flowchart illustrating a synchronization method in accordance with the present invention.

FIG. 1 generally illustrates the motion control synchronization method of the present invention. The generic synchronization strategy or application of the generic motion control synchronization framework is represented by 210. In this example, all agents (each agent being a dynamic system—four agents A1, A2, A3 and A4 are provided in the Figure for illustration purposes) have their input/output interfaces connected to a centralized box. Specific inter-connections within this box give information regarding synchronization choices among the agents. Such inter-connections can be represented by a numerical parameter matrix T, as shown in 220. The element of this matrix, denoted by Tij at 220, demonstrates the synchronization errors chosen for the ith agent relative to the jth agent. The numerical value of the element Tij gives quantitative information for the synchronization. For example, the number 0 means no connection at all; a non-zero number gives how strong the signal should be used; its direction is determined by the number's sign. Once the parameter matrix T is identified, the design focus is then placed upon finding solutions of T. Since each choice of T changes the values of the elements without structure modification, a generic control synchronization method can be deployed to ensure the stability and convergence, as shown in 230. The performance evaluation (240) and improvement (250) can be both handled by searching in the parameter space T (routines 260 and 270, respectively). Due to the numerical nature of matrix T, the search routine can be automated and optimized using numerical computational programs, in a manner that is known.

According to one aspect of the present invention, a uniform control framework is provided with a generic synchronization framework. The selections of synchronization errors are converted into a parameter matrix space (210), integrating the synchronization strategy decision-making with detailed choices, as compared to separate efforts as taught by the prior art.

According to another aspect of the present invention, a generic control synchronization method is provided (230), resulting from the novel concept of separating synchronization strategy from control implementation. In the prior art, the control method is customized depending on the specific synchronization choice. As a result, the control implementation relies on the synchronization decision-making. Once the synchronization strategy changes, the implementation requires modification accordingly. This is an expensive and time-consuming practice. Conversely, the generic control synchronization method provided herein is developed based on uniform synchronization matrix T. Changes in values of T do not affect the control structure. Therefore, the implementation modification is not required, or minimal and affordable.

According to another aspect of the present invention, the synchronization choices are converted into a numerically searchable matrix T (220). Systematic development, an automated process, and performance optimization are enabled (260, 270). The prior art, on the other hand, shows ad hoc selection of synchronization strategy, challenges in implementation modification, and trial-and-error evaluation of dynamic performance. Under this framework, it may not be entirely clear which strategy works better, until it has been implemented and tested. Instead, the present invention (220) allows for free choices of strategy and these choices can be made systematically through searching the feasible solutions in the parameter space T.

The system of the present invention is best understood as a motion control synchronization system that is operable to synchronize motions among multiple dynamic systems in performing coordinated dynamic systems based on the generic motion control synchronization framework of the present invention.

Figure 2:
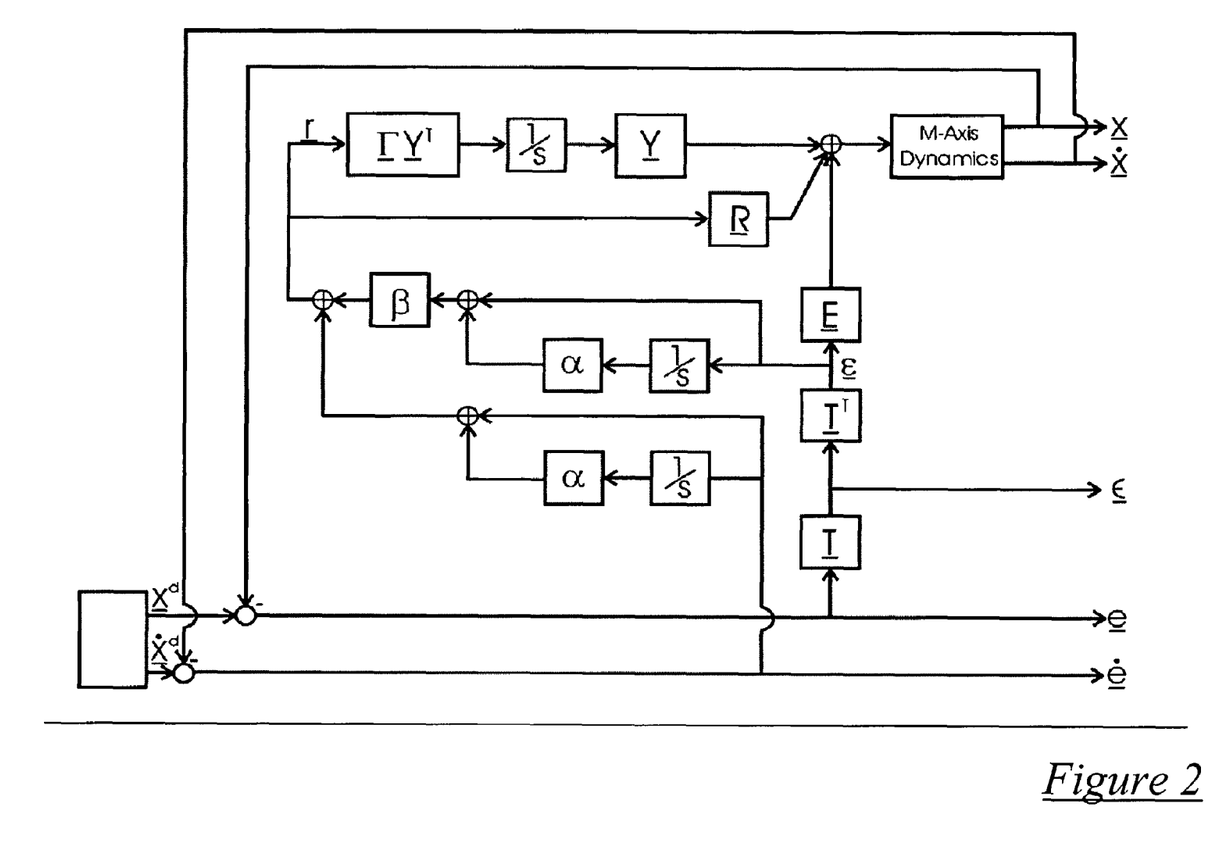
FIG. 2 is a system block diagram illustrating a representative system implementation of the present invention.

FIG. 2 is a system block diagram illustrating a representative system implementation of the present invention. It shows the adaptive control structure that provides the regulation and synchronization to the "M-Axis Dynamics" which represents the dynamic systems of multiple agents. The generic synchronization is given by the block T. It demonstrates that free choices of synchronization strategies are allowed without a need to implement modifications to the control framework per se.

The computer program of the present invention is best understood as control application operable to provide the generic motion control synchronization framework of the present invention, programmed in a manner known those skilled in the art. The features of the general framework can either be implemented as a generic application that interoperates with control applications associated with dynamic system; or the generic framework can be implemented in the control applications themselves. One advantage of the present invention is that synchronization of different dynamic systems having different control applications may be achieved using the generic application as an intermediary without the need for extensive integration of the different dynamic systems and/or their respective control applications.

In one particular embodiment of the present invention, a computer program executes the following step-wise algorithm to provide a generic control framework:

1. Develop the dynamic model of n agents to be synchronized $\underline{H}\ddot{\underline{x}} + \underline{C}\dot{\underline{x}} + \underline{F}(\underline{x},\dot{\underline{x}}) = \underline{Y}\underline{\theta} = \underline{\tau}$;

2. Obtain the estimates $\hat{\underline{H}}$, $\hat{\underline{C}}$, $\hat{\underline{F}}$ of $\underline{H}$, $\underline{C}$, $\underline{F}$, respectively;

3. Choose $\underline{R}$ and $\underline{E}$ such that $$\underline{R} = \begin{bmatrix} K_{R_1} & & \\ & \ddots & \\ & & K_{R_n} \end{bmatrix}$$

$$\underline{E} = \begin{bmatrix} K_\epsilon & & \\ & \ddots & \\ & & K_\epsilon \end{bmatrix}$$

$K_{R_i}$, $K_\epsilon$ are positive definite diagonal gain matrices.

4. Calculate errors: $\underline{e} = \underline{x}^d - \underline{x}$ based on the desired states $\underline{x}^d$ and actual states $\underline{x}$;

5. Find the generic synchronization error $\underline{\epsilon} = \underline{T}\underline{e}$;

6. Define the total feedback generalized velocity and position error as:

$\underline{r} = \dot{\underline{e}} + \alpha\underline{e} + \beta(\underline{\epsilon} + \alpha\underline{\xi})$ where $\alpha, \beta > 0$, $\underline{\epsilon} = \underline{T}^T\underline{\epsilon}$, $\underline{\xi} = \int_0^t \underline{\epsilon}(w)dw$ and the command signal is defined as $\underline{u} = \underline{r} + \dot{\underline{x}} = \dot{\underline{x}}^d + \alpha\underline{e} + \beta(\underline{\epsilon} + \alpha\underline{\xi})$ 7. The estimated parameter vector is subject to the adaptation law, $$\dot{\hat{\underline{\theta}}} = \Gamma Y^T \underline{r}$$

where $$\Gamma = \begin{bmatrix} \Gamma_1 & & \\ & \ddots & \\ & & \Gamma_n \end{bmatrix}$$

and $\Gamma_i$ is a positive diagonal matrix; and

8. Choose the torque input as:

$\underline{\tau} = \hat{H}\dot{\underline{u}} + \hat{C}\underline{u} + \hat{F} + \underline{R}\underline{r} + \underline{E}\underline{\epsilon} = Y\hat{\underline{\theta}} + \underline{R}\underline{r} + \underline{E}\underline{\epsilon}$ Synchronized motion control, especially with multiple dynamic systems being involved (different communication protocols, different control techniques, etc.), can result in numerous problems. One distinct problem is the "integration" of these multiple systems. The synchronization of motion control inherently requires adjustment of parameters to accommodate, for example, a change in conditions. Using prior art solutions, with multiple systems, the calculation of the adjusted parameters is either be too time consuming, prone to errors, or both.

Another aspect is that synchronization also requires inherently changes to be made dynamically, in which case a decrease in processing time is critical. The present invention permits adjustments to be made where processing time and processing resources required are desirable in comparison to the prior art solutions. This allows synchronization of motion control to be extended to numerous applications where they are not currently feasible.

In this regard, the essence is that the generic framework of the present invention works with the signals themselves that drive control commands (say, for example, in a navigation system). The generic framework, and the control framework within that, allows necessary adjustments to be calculated, for example, on the fly, quickly and efficiently.

It should be expressly understood that the invention applies to all dynamic systems, with the synchronization of vehicles as only one particular implementation. For example, the present invention applies to robots in the manufacturing industry. In essence, the present invention is directed to a plurality of dynamic systems that can communicate with one another for some joint purpose that is served by synchronized motion control.

It should also be noted that the present invention contemplates either ground and air vehicles, or both, where synchronization is achieved between the two. For example, present invention can be applied in situations where it is desired to maintain an aircraft flight pattern relative to a ground vehicle. This configuration may be ideal for specific geophysical exploration applications.

Further, it should be understood that a computer program for carrying out the calculations required for the method of the present invention can be implemented in a standard personal computer, or alternatively in a computer appliance specifically tailored for motion control applications.

In motion synchronization control, the designer's objectives are: 1) to achieve the asymptotic convergence of tracking and synchronization errors simultaneously, 2) to achieve the above object under acceptable control efforts; and 3) to reach the best transient performance possible. The present invention ensures the objective 1) by providing a uniform framework combined with an adaptive control strategy. In other words, it provides a feasible space that each member of the parameter matrix is a feasible solution, i.e., to achieve simultaneous convergence. Furthermore, objectives 2) and 3) can be achieved by adopting the framework presented in this invention, to search the feasible space for better (or optimal) solution, using numerical optimization methods available.

The present invention comprises a number of advantages over the existing approaches to ensure proper synchronization, coordination, or cooperation among multi-composes systems, including: (i) the asymptotic convergence of tracking and synchronization errors can be achieved simultaneously; (ii) synchronization can be achieved under reasonable control efforts; (iii) synchronization can be guaranteed under a uniform framework, i.e. motion synchronization is reached no matter what the specific synchronization choices are. Further, (iii) leads to a further advantage, namely that transient performance can be improved with proper choices of synchronization errors.

Example 1

The present invention was implemented in relation to the attitude angular velocity tracking control of multiple Unmanned Aerial Vehicles ("UAVs") [11]. The result was global asymptotic convergence of both the attitude angular velocity tracking and the angular velocity synchronization, even in the presence of system parameter uncertainties. Simulation results of multiple UAVs in coordination verify the effectiveness of the approach.

Please note that all reference to equation numbers, indicated by round brackets ( ), pertain only to this example.

1. Attitude Dynamics of UAV

From the traditional nonlinear aircraft model, the following attitude dynamics apply for UAVs $$J_{xx}\dot{P} - J_{xz}\dot{R} + (J_{zz} - J_{yy})QR - J_{xz}PQ = L \quad (1)$$

$$J_{yy}\dot{Q} + (J_{xx} - J_{zz})PR + J_{xz}(P^2 - R^2) = M \quad (2)$$

$$J_{zz}\dot{R} - J_{xz}\dot{P} + (J_{yy} - J_{xx})PQ + J_{xz}QR = N \quad (3)$$

where $J \in \Re^{3\times 3}$ is a positive-definite moment of inertia matrix, $J_{xx}, J_{yy}, J_{zz}$ and $J_{xz}$ are the corresponding elements, the applied moment $M \in \Re^3 \triangleq [L, M, N]^T$, $\Omega \in \Re^3 \triangleq [P, Q, R]^T$ is the attitude rate vector and P, Q, R are the roll, pitch, yaw rate, respectively.

The aim is to design a controller for attitude angular velocity tracking and angular velocity tracking synchronization between all UAVs. First, we introduce a pseudo attitude angle vector $\Theta \in \Re^3 \triangleq [\theta_P, \theta_Q, \theta_R]^T$ and $\dot{\theta}_P = P, \dot{\theta}_Q = Q, \dot{\theta}_R = R$. The pseudo attitude angle vector $\Theta$ is different from the classical Euler angle $[\phi\ \theta\ \psi]^T$ and is introduced only for controller design purpose.

Thus, the following augmented equations of attitude dynamics is obtained $$J_{xx}\ddot{\theta}_P - J_{xz}\ddot{\theta}_R + (J_{zz} - J_{yy})QR - J_{xz}PQ = L \quad (4)$$

$$J_{yy}\ddot{\theta}_Q + (J_{xx} - J_{zz})PR + J_{xz}(P^2 - R^2) = M \quad (5)$$

$$J_{zz}\ddot{\theta}_R - J_{xz}\ddot{\theta}_P + (J_{yy} - J_{xx})PQ + J_{xz}QR = N \quad (6)$$

or in matrix format $$J\ddot{\Theta} + N(\dot{\Theta}, J) = M \quad (7)$$

where the nonlinear term $N(\cdot) \in \Re^3$ is $$N(\dot{\Theta}, J) = \begin{bmatrix} (J_{zz} - J_{yy})QR - J_{xz}PQ \\ (J_{xx} - J_{zz})PR + J_{xx}(P^2 - R^2) \\ (J_{yy} - J_{xx})PQ + J_{xz}QR \end{bmatrix} \quad (8)$$

If n similar UAVs are considered, we have the following n attitude dynamics equations $$J_1\ddot{\Theta}_1 + N_1(\Omega_1, J_1) = M_1$$

$$J_2\ddot{\Theta}_2 + N_2(\Omega_2, J_2) = M_2$$

$$\vdots$$

$$J_i\ddot{\Theta}_i + N_i(\Omega_i, J_i) = M_i$$

$$\vdots$$

$$J_n\ddot{\Theta}_n + N_n(\Omega_n, J_n) = M_n$$

where subscript i denotes the i-th UAV.

Writing these n attitude dynamic equations in a matrix format, we have $$I\ddot{\Theta}+\overline{N}(\Omega,I)=\overline{M} \quad (9)$$

where $\Theta\in\Re^{3n}$, $\overline{N}\in\Re^{3n}$, $\overline{M}\in\Re^{3n}$ are vectors, $I\in\Re^{3n\times 3n}$ is a diagonal matrix, and they are of the following expressions $$I = diag[\, J_1 \quad J_2 \quad \cdots \quad J_i \quad \cdots \quad J_n \,]^T$$
$$\Theta = [\, \Theta_1 \quad \Theta_2 \quad \cdots \quad \Theta_i \quad \cdots \quad \Theta_n \,]^T$$
$$\overline{N} = [\, N_1 \quad N_2 \quad \cdots \quad N_i \quad \cdots \quad N_n \,]^T$$
$$\overline{M} = [\, M_1 \quad M_2 \quad \cdots \quad M_i \quad \cdots \quad M_n \,]^T$$
$$= [\, L_1 \quad M_1 \quad N_1 \quad L_2 \quad M_2 \quad N_2 \quad \cdots \quad L_i \quad M_i \quad N_i \quad \cdots \quad L_n \quad M_n \quad N_n \,]^T$$

2. Controller Design

2.1. Control Objective

First, we define $E(t)\in\Re^{3n}$ as the attitude angular velocity tracking error vector of n UAVs, $\Xi(t)\in\Re^{3n}$ as the angular velocity synchronization error vector. They have the following expressions $$E(t) \triangleq [\, e_1(t) \quad e_2(t) \quad \cdots \quad e_i(t) \quad \cdots \quad e_n(t) \,]^T \quad (10)$$

$$\Xi(t) \triangleq [\, \varepsilon_1(t) \quad \varepsilon_2(t) \quad \cdots \quad \varepsilon_i(t) \quad \cdots \quad \varepsilon_n(t) \,]^T \quad (11)$$

$$e_i(t) \triangleq \Omega_d(t) - \Omega_i(t) \quad (12)$$

$$\int e_i(t) \triangleq \Theta_d(t) - \Theta_i(t) \quad (13)$$

where $\Omega_d\in\Re^3$ is the desired attitude angular velocity trajectory. The details on synchronization error will be discussed below.

For synchronized attitude angular velocity tracking of multiple UAVs, first of all, the designed controller should guarantee the stability of the attitude angular velocity tracking errors of all involved systems. Secondly, the controller should also guarantee the stability of the angular velocity synchronization errors. Thirdly, the controller should regulate the attitude angular velocity motions to track the desired trajectory at the same rate so that the corresponding synchronization errors go to zero simultaneously.

Thus, the control objective becomes: $E(t)\to 0$ and $\Xi(t)\to 0$ as $t\to\infty$.

Without loss of generality, we reformat the attitude dynamic equations in Eq. (11) as follows $$I\dot{\Phi}+\overline{N}(\Omega,I)=\overline{Y}(\Phi,\Omega)\Psi=\overline{M} \quad (14)$$

where $Y_i\in\Re^{3\times 4}$ is the regression matrix and is composed of known variables, $\Psi_i\in\Re^4$ is a constant parameter vector, $\Phi_i\in\Re^3$ is a dummy variable vector and will be defined later, $\Psi\in\Re^{4n}$, $\overline{Y}\in\Re^{3n\times 4n}$. In practice, there exist uncertainties in the system parameters, such as the moments of inertia. We define $\hat{\Psi}$ as the estimation of $\Psi$. Moreover, the following expressions can be obtained $$\Psi = [\, \Psi_1 \quad \Psi_2 \quad \cdots \quad \Psi_i \quad \cdots \quad \Psi_n \,]^T \quad (15)$$

$$\Psi_i = [\, J_{xxi} \quad J_{yyi} \quad J_{zzi} \quad J_{xzi} \,]^T$$

-continued $$\Phi = [\, \Phi_1 \quad \Phi_2 \quad \cdots \quad \Phi_i \quad \cdots \quad \Phi_n \,]^T$$

$$\Phi = [\, \Phi_{Pi} \quad \Phi_{Qi} \quad \Phi_{Ri} \,]^T$$

$$\Phi_i = [\, \Phi_{Pi} \quad \Phi_{Qi} \quad \Phi_{Ri} \,]$$

$$\overline{Y} = diag[\, Y_1 \quad Y_2 \quad \cdots \quad Y_i \quad \cdots \quad Y_n \,]$$

$$Y_i(\Phi_i, \Omega_i) = \begin{bmatrix} \Phi_{Pi} & -Q_iR_i & Q_iR_i & -(\Phi_{Ri}+P_iQ_i) \\ P_iR_i & \Phi_{Qi} & -P_iR_i & P_i^2-R_i^2 \\ -P_iQ_i & P_iQ_i & \Phi_{Ri} & Q_iR_i-\Phi_{Pi} \end{bmatrix}$$

2.2. Synchronization Error

Synchronization error is used to identify the performance of synchronization controller, i.e. how the trajectory of each UAV converges with respect to each other. There are various ways to choose the synchronization error. In general, the attitude angular velocity synchronization error $\Xi(t)$ can be formulated as the following generalized expression $$\Xi(t)=TE(t) \quad (16)$$

where $\Xi(t)$ is a linear combination of attitude angular velocity tracking error $E(t)$, $T\in\Re^{3n\times 3n}$ is the generalized synchronization transformation matrix.

If we choose the following synchronization transformation matrix $$T = \begin{bmatrix} 2I & -I & & & -I \\ -I & 2I & -I & & \\ & \ddots & \ddots & \ddots & \\ & & -I & 2I & -I \\ -I & & & -I & 2I \end{bmatrix} \quad (17)$$

we can get the corresponding attitude angular velocity synchronization error $$\varepsilon_1(t) = 2e_1(t) - e_2(t) - e_n(t) \quad (18)$$
$$\varepsilon_2(t) = 2e_2(t) - e_3(t) - e_1(t)$$
$$\varepsilon_3(t) = 2e_3(t) - e_4(t) - e_2(t)$$
$$\vdots$$
$$\varepsilon_n(t) = 2e_n(t) - e_{n-1}(t) - e_1(t)$$

In a similar way, other kinds of synchronization errors can be formed. It can be seen from Eq. (18) that each individual UAV's synchronization error is a linear combination of its tracking error and two adjoining UAVs' tracking errors.

2.3. Adaptive Synchronization Controller

According to the control objective discussed previously, the designed control moment $\overline{M}(t)$ should guarantee convergences of both the attitude angular velocity tracking error $E(t)$ and the angular velocity synchronization error $\Xi(t)$ simultaneously, and realize expected transient characteristic of attitude angular velocity tracking motion.

To realize motion synchronization between all UAVs, we may include all synchronization errors related to a certain axis into this axis's controller for each UAV. However, this method can only be feasible when the UAVs number n is small. If n is extremely large, including all synchronization errors into each controller will lead to intensive on-line computational work. Thus, in this section, we try to design controller for each axis to stabilize its attitude angular velocity tracking motion and synchronize its motion with several adjacent attitude axes.

First, the coupled attitude angular velocity error E*(t) that contains both the attitude angular velocity tracking error E(t) and a linear combination of the angular velocity synchronization error Ξ(t) is introduced $$E^*(t)=E(t)+BT^T\int \Xi(t) \tag{19}$$

where $B \triangleq \text{diag}[B_1\ B_2\ \ldots\ B_n]$ is a positive coupling gain matrix, $E^* \triangleq \text{diag}[e_1^* e_2^* \ldots e_n^*]$ and its expanded expression is $$e_1^*(t) = e_1(t) + B_1 \int [2\varepsilon_1(\tau) - \varepsilon_2(\tau) - \varepsilon_n(\tau)] \tag{20}$$

$$e_2^*(t) = e_2(t) + B_2 \int [2\varepsilon_2(\tau) - \varepsilon_3(\tau) - \varepsilon_1(\tau)]$$

$$e_3^*(t) = e_3(t) + B_3 \int [2\varepsilon_3(\tau) - \varepsilon_4(\tau) - \varepsilon_2(\tau)]$$

$$\vdots$$

$$e_n^*(t) = e_n(t) + B_n \int [2\varepsilon_n(\tau) - \varepsilon_{n-1}(\tau) - \varepsilon_1(\tau)]$$

From Eq. (20) we can see that, the synchronization error $\epsilon_i(t)$ appears in $e_{i-1}^*$ and $e_{i+1}^*$ as negative value $-\epsilon_i(t)$, while as positive value $2\epsilon_i(t)$ in $e_i^*$. In this way, the coupled attitude errors are driven in opposite directions by $\epsilon_i(t)$, which contributes to the elimination of the synchronization error $\epsilon_i(t)$.

With notation of the coupled attitude angular velocity error E*(t), the coupled filtered tracking error for the ith UAV, $r_i(t) \in \Re^3$, is further defined as $$r_i(t)=e_i^*(t)+\Lambda_i \int e_i^*(t) \tag{21}$$

where $\Lambda_i(t) \in \Re^{3 \times 3}$ is a constant, diagonal, positive-definite, control gain matrix. For all n UAVs, the whole coupled filtered tracking error becomes $$r(t)=E^*(t)+\Lambda \int E^*(t) \tag{22}$$

where $r(t) \triangleq [r_1(t)\ r_2(t) \ldots r_n(t)]^T$, $\Lambda \in \Re^{3n \times 3n} = \text{diag}[\Lambda_1\ \Lambda_2 \ldots \Lambda_n]$.

To account for the uncertainties in system parameters, the controller is designed to contain an adaptation law for on-line estimation of the unknown parameters. The error between the actual and estimated parameters is defined by $$\tilde{\Psi}(t) \triangleq \Psi(t) - \hat{\Psi}(t) \tag{23}$$

where the parameter estimation error $\tilde{\Psi} \in \Re^{4n}$.

The dummy variable Φ introduced in Eq. (14) has the following expression $$\Phi = \ddot{\Theta}_d + \Lambda E^* + BT^T \Xi \tag{24}$$

Based on the dynamics equation (14), the control moment vector $\overline{M}$ is designed to be $$\overline{M}(t)=\overline{Y}(\Phi,\Omega)\hat{\Psi}(t)+Kr(t)+K_s T^T \int \Xi(t) \tag{25}$$

where $K \in \Re^{3n \times 3n}$ and $K_s \in \Re^{3n \times 3n}$ are two constant, diagonal, positive-definite, control gain matrices. The estimated parameter $\hat{\Psi}$ is subject to the adaptation law $$\dot{\hat{\Psi}} = \Gamma \overline{Y}^T(\cdot) r \tag{26}$$

where $\Gamma \in \Re^{4n \times 4n}$ is a constant, diagonal, positive-definite, adaptation gain matrix. By differentiating Eq. (23) with respect to time, the following closed-loop dynamics for the parameter estimation error can be obtained $$\dot{\tilde{\Psi}} = -\Gamma \overline{Y}^T(\cdot) r \tag{27}$$

Theorem 1. The proposed adaptive synchronization coupling controller Eqs. (25) and (26) guarantees the global asymptotic convergences of both the attitude angular velocity tracking error E(t) and the angular velocity synchronization error Ξ(t), i.e., $$\lim_{t \to \infty} E(t), \Xi(t) = 0 \tag{28}$$

Proof. Considering the following positive definite Lyapunov function $$V(r, \tilde{\Psi}, \Xi) \triangleq \tag{29}$$

$$\frac{1}{2}\left[ r^T I r + \tilde{\Psi}^T \Gamma^{-1} \tilde{\Psi} + \left(\int \Xi\right)^T K_s \int \Xi + \left(\int\int T^T \Xi\right)^T B\Lambda K_s \left(\int\int T^T \Xi\right) \right]$$

Differentiating Eq. (29) with respect to time t yields $$\dot{V}(r, \tilde{\Psi}, \Xi) = \tag{30}$$

$$r^T I \dot{r} + \tilde{\Psi}^T \Gamma^{-1} \dot{\tilde{\Psi}} + \int \Xi^T K_s \Xi + \left(\int\int T^T \Xi\right)^T B\Lambda K_s T^T \int \Xi$$

Differentiating Eq. (22) with respect to time t and consider Eqs. (19, 24), we have $$\dot{r} = \dot{E}^* + \Lambda E^* = \dot{E} + BT^T \int \Xi + \Lambda E^* \tag{31}$$

$$= \ddot{\Theta}_d - \ddot{\Theta} + BT^T \int \Xi + \Lambda E^*$$

$$= \Phi - \ddot{\Theta}$$

Multiplying I at the both sides of Eq. (31), substituting Eqs. (9, 14, 15) into it, we obtain $$I\dot{r} = I\Phi - I\ddot{\Theta}$$

$$= \overline{Y}(\Phi, \Omega)\Psi - \overline{M}$$

$$= \overline{Y}(\Phi, \Omega)\Psi - Kr - K_s T^T \int \Xi$$

Substituting Eqs. (27, 32) into Eq. (30) yields $$\dot{V}(r, \tilde{\Psi}, \Xi) = r^T I \dot{r} + \tilde{\Psi}^T \Gamma^{-1} \dot{\tilde{\Psi}} + \int \Xi^T K_s \Xi + \left( \int \int T^T \Xi \right)^T B \Lambda K_s T^T \int \Xi \quad (33)$$

$$= r^T \left[ \overline{Y}(\Phi, \Omega) \tilde{\Psi} - Kr - K_s T^T \int \Xi \right] +$$

$$\tilde{\Psi}^T \Gamma^{-1} \left[ -\Gamma \overline{Y}^T(\cdot) r \right] + \int \Xi^T K_s \Xi +$$

$$\left( \int \int T^T \Xi \right)^T B \Lambda K_s T^T \int \Xi$$

$$= -r^T Kr - r^T K_s T^T \int \Xi + \int \Xi^T K_s \Xi +$$

$$\left( \int \int T^T \Xi \right)^T B \Lambda K_s T^T \int \Xi$$

Replacing r in the second term of Eq. (33) with Eqs. (19, 22), we have $$\dot{V}(\cdot) = -\left[ E + BT^T \int \Xi + \Lambda \int E + B\Lambda T^T \int \int \Xi \right]^T \cdot$$

$$K_s T^T \int \Xi - r^T Kr + \int \Xi^T K_s \Xi +$$

$$\left( \int \int T^T \Xi \right)^T B \Lambda K_s T^T \int \Xi$$

$$= -r^T Kr - \int (T^T \Xi)^T B K_s T^T \int \Xi -$$

$$\int \Xi^T \Lambda K_s \int \Xi$$

Because K, $BK_s$, and $\Lambda K_s$ are all positive-definite matrices, so we can conclude that $$\dot{V}(\cdot) = -r^T Kr - \int (T^T \Xi)^T B K_s \int (T^T \Xi) - \int \Xi^T \Lambda K_s \int \Xi \leq 0 \quad (34)$$

Since $\dot{V}(r, \tilde{\Psi}, \Xi) \leq 0$ in Eq. (34), the $V(r, \tilde{\Psi}, \Xi)$ given in Eq. (29) is either decreasing or constant. Due to the fact that $V(r, \tilde{\Psi}, \Xi)$ is non-negative, we conclude that $V(r, \tilde{\Psi}, \Xi) \in L_\infty$; hence $r \in L_\infty$ and $\tilde{\Psi} \in L_\infty$. With $r \in L_\infty$, we conclude from Eq. (22) that $E^*(t) \in L_\infty$ and $\int E^*(t) \in L_\infty$, and $\int E(t)$, $E(t)$, $\int \Xi(t)$, $\Xi \in L_\infty$ based on the definition in Eq. (19). Because of the boundedness of $\Theta_d(t)$ and $\Omega_d(t)$, we conclude that $\Theta(t) \in L_\infty$ and $\Omega(t) \in L_\infty$ from Eq. (13). Taking $\tilde{\Psi} \in L_\infty$ and $\Psi$ a constant vector, $\hat{\Psi} \in L_\infty$ is obtained from Eq. (23). With the previous boundedness statements and the fact that $\dot{\Theta}_d(t)$ is also bounded, the dummy variable $\Phi \in L_\infty$ and $\overline{Y}(\cdot) \in L_\infty$ can be concluded from their definitions in Eq. (24) and Eq. (15). Hence, the control input $\overline{M} \in L_\infty$ is also determined from Eq. (25). The preceding information can also be used to Eq. (9) and Eq. (31) to get $\ddot{\Theta}(t)$, $\dot{r}(t) \in L_\infty$. Until now, we have explicitly illustrated that all signals in the adaptive synchronization controller and system remain bounded during the closed-loop operation.

From Eq. (34), we show that $r \in L_2$, $T^T \int \Xi(t) \in L_2$ and Error! Objects cannot be created from editing field codes. Hence, $\int E^*(t) \in L_2$ and $E^*(t) \in L_2$ can be concluded from Eq. (22). From Eq. (19), we conclude $E(t) \in L_2$ since $T^T \int \Xi(t) \in L_2$ and $E^*(t) \in L_2$. Moreover, we have $\int E(t) \in L_2$ because of Error! Objects cannot be created from editing field codes. When $\ddot{\Theta}(t) \in L_\infty$ and $\ddot{\Theta}_d(t)$ is bounded, $\dot{E}(t) \in L_\infty$ can be concluded. Considering $E(t) \in L_2$ and $\dot{E}(t) \in L_\infty$, we can conclude that $\Xi \in L_2$ and $\dot{\Xi} \in L_\infty$. Thus, a known corollary can be applied to conclude that $$\lim_{t \to \infty} E(t) = 0 \quad \lim_{t \to \infty} \Xi(t) = 0$$

3. Simulation

To illustrate this example, the cooperative motion of four UAVs is examined. The UAVs are chosen as Hanger 9 J-3 Piper Cub like UAV. The parameters, moments of inertia, given in Table 1 are modified according to known values. These four UAVs are required to track the following three-axis attitude angular rate profiles.

$$P_d(t) = 0.5\pi \cos(0.1\pi t)$$

$$Q_d(t) = 0.4\pi \cos(0.1\pi t)$$

$$R_d(t) = 0.3\pi \cos(0.1\pi t) \quad (35)$$

The control and adaptation gains are also given in Table 1.

TABLE 1

System parameters and control gains of multiple UAVs.

| Symbol | Value |
| --- | --- |
| $\Psi_i$ | $\Psi_1 = [1.6, 2.37, 2.5, 0.55]$, $\Psi_2 = [3.0, 6.7, 9.0, 0.7]$ |
| | $\Psi_3 = [1.2, 1.6, 2.3, 0.3]$, $\Psi_4 = [4.74, 6.03, 9.8, 0.8]$ |
| $\hat{\Psi}_i(0)$ | $0.8\Psi_1, 0.9\Psi_2, 1.1\Psi_3, 1.2\Psi_4$ |
| $K_i$ | $K_1 = \text{diag}[25, 25, 25]$, $K_2 = \text{diag}[30, 30, 30]$ |
| | $K_3 = \text{diag}[15, 15, 15]$, $K_4 = \text{diag}[45, 65, 75]$ |
| $K_{si}$ | $K_{s1} = \text{diag}[4, 4, 4]$, $K_{s2} = \text{diag}[6, 6, 6]$ |
| | $K_{s3} = \text{diag}[3, 3, 3]$, $K_{s4} = \text{diag}[7, 7.5, 8]$ |
| $\Lambda_i$ | $\Lambda_1 = \text{diag}[8, 8, 8]$, $\Lambda_2 = \text{diag}[10, 10, 10]$ |
| | $\Lambda_3 = \text{diag}[3, 3, 3]$, $\Lambda_4 = \text{diag}[8, 8, 8]$ |
| $\Gamma_i$ | $\Gamma_1 = \text{diag}[11, 11, 11, 11]$ |
| | $\Gamma_2 = \text{diag}[25, 25, 25, 25]$ |
| | $\Gamma_3 = \text{diag}[10, 10, 10, 10]$ |
| | $\Gamma_4 = \text{diag}[30, 30, 30, 30]$ |
| $B_i$ | $\text{diag}[10, 10, 10]$ |

For evaluation of control performance, we calculated the 2-norm of the attitude angular velocity tracking error E(t) and the angular velocity synchronization error $\Xi(t)$. The values in Table 2 show that although the attitude angular velocity tracking error $E(t) \to 0$ can be realized by using adaptive controller without synchronization strategy, there are significant differences between the attitude angular velocity tracking errors of all involved UAVs. It means that the attitude angular velocity synchronization errors are large and the attitude angular velocity tracking motions are not synchronized well. However, with the proposed synchronization strategy, the synchronization errors can be remarkably reduced. Take the attitude angular velocity tracking motion of z-axis as an example. Without synchronization strategy, the 2-norm of the attitude angular velocity tracking errors and the attitude angular velocity synchronization errors for four UAVs are 21.193, 35.304, 59.490, 14.830 and 35.228, 92.403, 110.478, 51.192 (deg/sec), respectively. With the synchronization strategy, the corresponding 2-norm values are 23.861, 24.191, 27.281, 24.631 and 3.846, 17.047, 21.701, 10.849 (deg/sec), respectively. The 2-norm of the attitude angular velocity tracking errors have been regulated to be very close values. In this way, the synchronization errors are reduced observably.

TABLE 2

Performance evaluation of various control strategies

| Errors | UAV I | UAV II | UAV III | UAV IV |
|---|---|---|---|---|
| *No synchronization* | | | | |
| $\|\dot{e}_x\|_2$ | 49.285 | 81.439 | 53.184 | 42.411 |
| $\|\dot{e}_y\|_2$ | 10.235 | 30.254 | 53.054 | 21.316 |
| $\|\dot{e}_z\|_2$ | 21.193 | 35.304 | 59.490 | 14.830 |
| $\|\epsilon_x\|_2$ | 59.009 | 136.095 | 97.633 | 36.513 |
| $\|\epsilon_y\|_2$ | 40.887 | 67.880 | 98.714 | 47.949 |
| $\|\epsilon_z\|_2$ | 35.228 | 92.403 | 110.478 | 51.192 |
| *With synchronization strategy* | | | | |
| $\|\dot{e}_x\|_2$ | 38.029 | 34.924 | 26.767 | 28.719 |
| $\|\dot{e}_y\|_2$ | 18.197 | 19.005 | 17.311 | 18.523 |
| $\|\dot{e}_z\|_2$ | 23.861 | 24.191 | 27.281 | 24.631 |
| $\|\epsilon_x\|_2$ | 42.531 | 33.950 | 49.733 | 22.674 |
| $\|\epsilon_y\|_2$ | 12.393 | 14.557 | 16.666 | 13.360 |
| $\|\epsilon_z\|_2$ | 3.846 | 17.047 | 21.701 | 10.849 |

Example 2

In another implementation of the present invention, a synchronized trajectory tracking control strategy was prepared for experimental three-degrees-of-freedom ("3-DOF") helicopters [13]. This model-based controller included a feedforward dynamic term and used a PD control law as feedback. The convergence was achieved for both trajectory tracking and the motion synchronization. A proposed generalized synchronization concept further improved the transient performance. The numerical simulation results of four helicopters in coordination were determined.

Please note that all reference to equation numbers indicated by round brackets ( ) pertain only to this example.

1. Modeling of 3-DOF Helicopter

For this example, four 3-DOF helicopters (from Quanser Inc., 80 Esna Park Drive, #1, Markham, Ontario, Canada L3R 2R6) are employed having active disturbance systems (ADS), which can emulate uncertainties in system parameters and act as disturbances on control system. The three degrees-of-freedom are elevation, pitch, and travel.

(i) Elevation axis. The elevation motion can be described by the following differential equation:

$$J_e\ddot{\alpha} = K_f l_a \cos(\beta)(V_f + V_b) - mgl_a\sin(\alpha + \alpha_0) \quad (1)$$
$$= K_f l_a \cos(\beta) V_s - mgl_a\sin(\alpha + \alpha_0)$$

where $\alpha_0$ is the angle between helicopter arm and its base.

(ii) Pitch axis. The pitch axis is controlled by the difference of the forces generated by the propellers:

$$J_p\ddot{\beta} = K_f l_h(V_f - V_b) = K_f l_h V_d \quad (2)$$

If the force generated by the front motor is higher than the force generated by the back motor, the helicopter body will pitch up (positive). It should be noted that the pitch angle is limited among $$\left(-\frac{\pi}{2}, \frac{\pi}{2}\right)$$

mechanically during experiment.

(iii) Travel axis. The only way to apply a force in the travel direction is to pitch body of the helicopter. The corresponding dynamic equation of travel axis is:

$$J_t\ddot{\gamma} = K_f l_a \sin\beta\sin(\alpha + \alpha_0)(V_f + V_b) + \quad (3)$$
$$K_f l_h \cos(\alpha + \alpha_0)(V_f - V_b)$$
$$= K_f l_a \sin\beta\sin(\alpha + \alpha_0)V_s + K_f l_h\cos(\alpha + \alpha_0)V_d$$

If $(\alpha+\alpha_0)=\pi/2$, i.e. the arm is in horizontal position, the above travel motion becomes $$J_t\ddot{\gamma} = K_f l_\alpha \sin\beta \sin(\alpha+\alpha_0)V_s \quad (4)$$

From the above modeling we know that, the elevation acceleration is a function of the sum of the voltages applied to the two motors, and the pitch acceleration is a function of difference between them. If the pitch angle $\beta$ and elevation angle $\alpha$ are constants and $\beta$ is a small value, the travel motion become $$J_t\ddot{\gamma} = K^*\beta \quad (5)$$

where $K^*=K_f l_\alpha V_s \sin(\alpha+\alpha_0)$ and this equation means that the travel acceleration is governed by the pitch angle. Considering these modeling characteristics and assuming the travel motion can be achieved by high-precise pitch tracking, we can simplify the 3-DOF attitude dynamics to 2-DOF one, which includes elevation and pitch motion, as given in (6).

$$\begin{bmatrix} \dfrac{J_e}{K_f l_a \cos\beta} & 0 \\ 0 & \dfrac{J_p}{K_f l_h} \end{bmatrix}\begin{bmatrix}\ddot{\alpha}\\\ddot{\beta}\end{bmatrix} + \begin{bmatrix}\dfrac{mg\sin(\alpha+\alpha_0)}{K_f\cos\beta}\\0\end{bmatrix} = \begin{bmatrix}V_s\\V_d\end{bmatrix} \quad (6)$$

and in matrix format $$J\ddot{\Theta} + N(\Theta, m, K_f) = v \quad (7)$$

where $$J \in R^{2\times 2} = diag\left[\dfrac{J_e}{K_f l_a \cos\beta}\; \dfrac{J_p}{K_f l_h}\right]$$

is the moment of inertia, $\Theta \in \mathbb{R}^2 = [\alpha\beta]^T$ is the attitude (elevation and pitch) vector, $$N(\Theta, m, K_f) \in \mathbb{R}^2 = \left[\dfrac{mg\sin(\alpha+\alpha_0)}{K_f\cos\beta}\; 0\right]^T$$

is the nonlinear term, and $v \in \mathbb{R}^2 = [V_s\; V_d]^T$ is control voltage vector. For $$-\frac{\pi}{2} < \beta < \frac{\pi}{2},$$

the inertia matrix J is a positive-definite matrix.

Consider n such helicopters, we have a set of dynamic equations $$J_1 \ddot{\Theta}_1 + N_1(\Theta_1, m_1, K_{f1}) = V_1 \quad (8)$$
$$\vdots$$
$$J_i \ddot{\Theta}_i + N_i(\Theta_i, m_i, K_{fi}) = V_i$$
$$\vdots$$
$$J_n \ddot{\Theta}_n + N_n(\Theta_n, m_n, K_{fn}) = V_n$$

The above equation set can be further formulated in a matrix format as $$I\ddot{\Theta} + \tilde{N}(\Theta, m, K_f) = V \quad (9)$$

where $\Theta \in \mathbb{R}^{2n}$, $\tilde{N} \in \mathbb{R}^{2n}$, $v \in \mathbb{R}^{2n}$, $m \in \mathbb{R}^n$, $K_f \in \mathbb{R}^n$ are vectors, $I \in \mathbb{R}^{2n \times 2n}$ is a diagonal inertia matrix, and they have the following expressions $$I = \text{diag}[J_1\ J_2 \ldots J_i \ldots J_n]$$
$$\Theta = [\Theta_1\ \Theta_2 \ldots \Theta_i \ldots \Theta_n]^T = [\alpha_1\ \beta_1\ \alpha_2\ \beta_2 \ldots \alpha_i\ \beta_i \ldots \alpha_n\ \beta_n]^T$$
$$m = [m_1\ m_2 \ldots m_i \ldots m_n]^T$$
$$K_f = [K_{f1}\ K_{f2} \ldots K_{fi} \ldots K_{fn}]^T$$
$$\tilde{N} = [N_1\ N_2 \ldots N_i \ldots N_n]^T$$
$$V = [V_1\ V_2 \ldots V_i \ldots V_n]^T = [V_{s1}\ V_{d1}\ V_{s2}\ V_{d2} \ldots V_{si}\ V_{di} \ldots V_{sn}\ V_{dn}]^T$$

2. Synchronization Controller Design

2.1. Control Objective

First, we define $E(t) \in \mathbb{R}^{2n}$, $\dot{E}(t) \in \mathbb{R}^{2n}$ as the attitude angle and attitude angular velocity tracking error vectors of n 3-DOF helicopters, $\Xi(t) \in \mathbb{R}^{2n}$ au $\dot{\Xi}(t)$ as the synchronization error and error derivative vectors. They have the following expressions $$E(t) \triangleq [e_1(t)\ e_2(t) \ldots e_i(t) \ldots e_n(t)]^T \quad (10)$$
$$\dot{E}(t) \triangleq [\dot{e}_1(t)\ \dot{e}_2(t) \ldots \dot{e}_i(t) \ldots \dot{e}_n(t)]^T \quad (11)$$
$$\Xi(t) \triangleq [\epsilon_1(t)\ \epsilon_2(t) \ldots \epsilon_i(t) \ldots \epsilon_n(t)]^T \quad (12)$$
$$\dot{\Xi}(t) \triangleq [\dot{\epsilon}_1(t)\ \dot{\epsilon}_2(t) \ldots \dot{\epsilon}_n(t)]^T \quad (13)$$
$$e_i(t) \triangleq \Theta_d(t) - \Theta_i(t) \quad (14)$$
$$\dot{e}_i(t) \triangleq \dot{\Theta}_d(t) - \dot{\Theta}_i(t) \quad (15)$$

where $\Theta_d \in \mathbb{R}^2$ and $\dot{\Theta}_d \in \mathbb{R}^2$ are the desired trajectories for attitude angle and angular velocity. The details on synchronization error will be discussed in the subsequent section.

For synchronized trajectory tracking of multiple 3-DOF helicopters, first of all, the designed controller should guarantee the stability of the attitude trajectory tracking errors of all involved systems. Secondly, the controller should also guarantee the stability of the synchronization errors. Thirdly, the controller should regulate the attitude motion to track the desired trajectory at the same rate so that the synchronization errors go to zero simultaneously.

Thus, the control objective becomes: $E(t) \to 0$, $\Xi(t) \to 0$ as $t \to \infty$.

2.2. Generalized Synchronization Error

Synchronization error is used to identify the performance of synchronization controller, i.e. how the trajectory of each 3-DOF helicopter converges with respect to each other. There are various known ways to choose the synchronization error. However, when the number of involved systems is extreme large, this kind of synchronization strategy will lead to intensive on-line computational work. Thus, we propose the following more feasible and efficient concept of generalized synchronization error.

$$\Xi(t) = TE(t) \quad (16)$$

where $\Xi(t)$ is a linear combination of attitude tracking error $E(t)$, $T \in \mathbb{R}^{2n \times 2n}$ is the generalized synchronization transformation matrix.

By choosing different matrix T, we can form different synchronization errors. For example, if we choose the following synchronization transformation matrix T, $$T = \begin{bmatrix} I & -I & & & \\ & I & -I & & \\ & & \ddots & \ddots & \\ & & & I & -I \\ -I & & & & I \end{bmatrix} \quad (17)$$

we get the following synchronization error formula $$\varepsilon_1(t) = e_1(t) - e_2(t) \quad (18)$$
$$\varepsilon_2(t) = e_2(t) - e_3(t)$$
$$\varepsilon_3(t) = e_3(t) - e_4(t)$$
$$\vdots$$
$$\varepsilon_n(t) = e_n(t) - e_1(t)$$

The synchronization error in Eq. (18) has been used for the synchronization control of multiple robotic manipulators.

More complicated synchronization error formulas, such as those given in Eqs. (19, 20), can be obtained by applying the synchronization transformation matrices in Eqs. (21, 22).

$$\varepsilon_1(t) = 2e_1(t) - e_2(t) - e_n(t) \quad (19)$$
$$\varepsilon_2(t) = 2e_2(t) - e_3(t) - e_1(t)$$
$$\vdots$$
$$\varepsilon_n(t) = 2e_n(t) - e_{n-1}(t) - e_1(t)$$

$$\varepsilon_1(t) = 3e_1(t) - e_2(t) - e_3(t) - e_n(t) \quad (20)$$
$$\varepsilon_2(t) = 3e_2(t) - e_3(t) - e_4(t) - e_1(t)$$
$$\vdots$$
$$\varepsilon_n(t) = 3e_n(t) - e_1(t) - e_2(t) - e_{n-1}(t)$$

$$T = \begin{bmatrix} 2I & -I & & & -I \\ -I & 2I & -I & & \\ & \ddots & \ddots & \ddots & \\ & & -I & 2I & -I \\ -I & & & -I & 2I \end{bmatrix} \quad (21)$$

$$T = \begin{bmatrix} 3I & -I & -I & & -I \\ -I & 3I & -I & -I & \\ & \ddots & \ddots & \ddots & \\ -I & & -I & 3I & -I \\ -I & -I & & -I & 3I \end{bmatrix} \quad (22)$$

In Eqs. (18, 19, 20), each individual helicopter's synchronization error is a linear combination of its tracking error and one, two or three adjoining helicopters' tracking errors. Under the same controller gains, the synchronization error in Eq. (20) is expected to produce the best synchronization performance among these three synchronization errors because the most tracking errors are included in each controller. Whereas, the synchronization error in Eq. (18) will produce the worst synchronization performance. Obviously, other kinds of synchronization errors can be formed in a similar way.

2.3. Coupled Attitude Error

For controller design, the coupled attitude error $E^*(t) \in \mathbb{R}^{2n}|$ that contains both attitude trajectory tracking error $E(t)$ and the synchronization error $\Xi(t)$ is introduced $$E^*(t) = E(t) + BT^T \int_0^t \Xi d\tau \tag{23}$$

where $$E^* \triangleq [e_1^* \ e_2^* \ \cdots \ e_n^*]^T B \triangleq diag[B_1 \ B_2 \ \cdots \ B_n]$$

is a positive coupling gain matrix.

Correspondingly, the coupled angular velocity error can be expressed as $$\dot{E}^*(t) = \dot{E}(t) + BT^T \Xi(t)| \tag{24}$$

For the synchronization transformation matrix T in Eq. (17), the coupled attitude errors will be $$e_1^*(t) = e_1(t) + B_1 \int_0^t (\varepsilon_1(\tau) - \varepsilon_n(\tau)) d\tau \tag{25}$$

$$e_2^*(t) = e_2(t) + B_2 \int_0^t (\varepsilon_2(\tau) - \varepsilon_1(\tau)) d\tau$$

$$\vdots$$

$$e_n^*(t) = e_n(t) + B_n \int_0^t (\varepsilon_n(\tau) - \varepsilon_{n-1}(\tau)) d\tau$$

Similarly, the coupled attitude errors corresponding to T in Eqs. (21, 22) are $$e_1^*(t) = e_1(t) + B_1 \int_0^t (2\varepsilon_1(\tau) - \varepsilon_2(\tau) - \varepsilon_n(\tau)) d\tau \tag{26}$$

$$e_2^*(t) = e_2(t) + B_2 \int_0^t (2\varepsilon_2(\tau) - \varepsilon_3(\tau) - \varepsilon_1(\tau)) d\tau$$

$$\vdots$$

$$e_n^*(t) = e_n(t) + B_n \int_0^t (2\varepsilon_n(\tau) - \varepsilon_{n-1}(\tau) - \varepsilon_1(\tau)) d\tau$$

and $$e_1^*(t) = e_1(t) + B_1 \int_0^t (3\varepsilon_1(\tau) - \varepsilon_2(\tau) - \varepsilon_{n-1}(\tau) - \varepsilon_n(\tau)) d\tau \tag{27}$$

$$e_2^*(t) = e_2(t) + B_2 \int_0^t (3\varepsilon_2(\tau) - \varepsilon_3(\tau) - \varepsilon_n(\tau) - \varepsilon_1(\tau)) d\tau$$

$$\vdots$$

$$e_n^*(t) = e_n(t) + B_n \int_0^t (3\varepsilon_n(\tau) - \varepsilon_1(\tau) - \varepsilon_{n-2}(\tau) - \varepsilon_{n-1}(\tau)) d\tau$$

From Eq. (25) we can see that, the synchronization error $\epsilon_i(t)|$ appears in $$e_i^*(t) \text{ and } e_{i+1}^*(t)$$

with opposite sign. Similar observations are obtained for the synchronization error in Eqs. (26, 27). In this way, the coupled attitude errors are driven in opposite directions by $\epsilon_i(t)|$, which contributes to the elimination of the synchronization error $\epsilon_i(t)|$.

2.4. Synchronized Tracking Controller

The synchronized tracking controller includes two parts: feedback and feedforward. The feedback part employs PD feedback law plus synchronization feedback term, $$u(t) = K_P E^*(t) + K_D \dot{E}^*(t) + K_s T^T \Xi(t)| \tag{28}$$

where $K_P, K_D, K_s \in \mathbb{R}^{2n \times 2n}|$ are constant, diagonal, positive-definite, control gain matrices.

By defining the following coupled filtered tracking error, $$r(t) = \dot{E}^*(t) + \Lambda E^*(t) \tag{29}$$

we can rewrite Eq. (28) as $$u(t) = Kr(t) + K_s T^T \Xi(t) \tag{30}$$

where $r(t) \triangleq [r_1(t) \ r_2(t) \ \ldots \ r_n(t)]^T$, $\Lambda \in \mathbb{R}^{2n \times 2n} \triangleq diag[K_{P1}/K_{D1} \ K_{P2}/K_{D2} \ \ldots \ K_{Pn}/K_{Dn}]$, $K = K_D$.

The feedforward part, $\tilde{u}(t)$, is designed to be $$\tilde{u}(t) = I\Phi + \tilde{N}(\Theta, m, K_f) \tag{31}$$

where $\Phi = \ddot{\Theta}_d + \Lambda \dot{E}^* + BT^T \dot{\Xi}.|$

So the total control voltage $V(t)$ is $$V(t) = \tilde{u}(t) + u(t) \tag{32}$$

$$= I\Phi + \tilde{N}(\Theta, m, K_f) + Kr(t) + K_s T^T \Xi(t)$$

Theorem 1. The proposed synchronization controller in (30, 31, 32) guarantees asymptotic convergence to zero of both attitude trajectory tracking error $E(t)$ and synchronization error $\Xi(t)$ for pitch angle $$\beta \in \left(-\frac{\pi}{2}, \frac{\pi}{2}\right), \text{ i.e.}$$

$$\lim_{t \to \infty} E(t), \Xi(t) = 0 \tag{33}$$

Proof. Choose the following Lyapunov function $$V(r, \Psi, \Xi) \triangleq \tag{34}$$

$$\frac{1}{2} r^T Ir + \frac{1}{2} \Psi^T \Gamma^{-1} \Psi + \frac{1}{2} \Xi^T K_s \Xi + \frac{1}{2} \left(\int T^T \Xi d\tau\right)^T B \Lambda K_s \left(\int T^T \Xi d\tau\right)$$

Because $\Gamma^{-1}$, $K_s$, $B\Lambda$ are all positive-definite matrices and I is positive-definite when pitch angle $$\beta \in \left(-\frac{\pi}{2}, \frac{\pi}{2}\right),$$

thus the Lyapunov function $V(r,\Xi)$ is a positive-definite function when $$\beta \in \left(-\frac{\pi}{2}, \frac{\pi}{2}\right).$$

Differentiating (34) with respect to time t yields $$\dot{V}(r,\Xi) = r^T I\dot{r} + \Xi^T K_s \dot{\Xi} + (\int T^T \Xi d\tau)^T B\Lambda K_s T^T \Xi \quad (35)$$

Differentiating (29) with respect to time t and consider (10, 14, 23, 24), we have $$\dot{r} = \ddot{E}^* + \Lambda \dot{E}^* \quad (36)$$
$$= \ddot{E} + BT^T \dot{\Xi} + \Lambda \dot{E}^*$$
$$= \ddot{\Theta}_d - \ddot{\Theta} + BT^T \dot{\Xi} + \Lambda \dot{E}^*$$
$$= \Phi - \ddot{\Theta}$$

Multiplying I at the both sides of (36) and substituting with (9, 32), we obtain $$I\dot{r} = I\Phi - I\ddot{\Theta} \quad (37)$$
$$= I\Phi - (V - \tilde{N}(\Theta, m, K_f))$$
$$= I\Phi + \tilde{N}(\Theta, m, K_f) -$$
$$(I\Phi + \tilde{N}(\Theta, m, K_f) + Kr(t) + K_s T^T \Xi(t))$$
$$= -Kr - K_s T^T \Xi$$

Substituting (37) into (35) yields $$\dot{V}(r,\Xi) = r^T I\dot{r} + \Xi^T K_s \dot{\Xi} + \left(\int T^T \Xi d\tau\right)^T B\Lambda K_s T^T \Xi \quad (38)$$
$$= -r^T K r - r^T K_s T^T \Xi + \Xi^T K_s \dot{\Xi} +$$
$$\left(\int T^T \Xi d\tau\right)^T B\Lambda K_s T^T \Xi$$

Replacing r in the second term of (38) with (23, 24, 29), we have $$\dot{V}(r,\Xi) = -r^T K r - \left[\dot{E} + BT^T \Xi + \Lambda E + B\Lambda T^T \int \Xi d\tau\right]^T K_s T^T \Xi +$$
$$\Xi^T K_s \dot{\Xi} + \left(\int T^T \Xi d\tau\right)^T B\Lambda K_s T^T \Xi$$
$$= -r^T K r - (T\dot{E})^T K_s \Xi - \Xi^T T B K_s T^T \Xi -$$
$$(TE)^T \Lambda K_s \Xi + \Xi^T K_s \dot{\Xi}$$
$$= -r^T K r - (T^T \Xi)^T B K_s T^T \Xi - \Xi^T \Lambda K_s \Xi$$

Because K, $BK_s$, and $\Lambda K_s$ are all positive-definite matrices, so we can conclude that $$\dot{V}(r,\Xi) = -r^T K r - (T^T \Xi)^T B K_s T^T \Xi - \Xi^T \Lambda K_s \Xi \leq 0 \quad (39)$$

Since $\dot{V}(r,\Xi) \leq 0$ in (39), the $V(r,\Xi)$ given in (34) is either decreasing or constant. Due to the fact that $V(r,\Xi)$ is non-negative, we conclude that $V(r,\Xi) \in \mathcal{L}_\infty$, hence $r \in \mathcal{L}_\infty$. With $r \in \mathcal{L}_\infty$, we can conclude from (29) that $\dot{E}^*(t) \in \mathcal{L}_\infty$ and $E^*(t) \in \mathcal{L}_\infty$, and $E(t), \dot{E}(t), \Xi(t), \dot{\Xi}(t) \in \mathcal{L}_\infty$] based on their definitions. Because of the boundedness of $\Theta_d(t)$ and $\dot{\Theta}_d(t)$, we conclude that $\Theta(t) \in \mathcal{L}_\infty$ and $\dot{\Theta}(t) \in \mathcal{L}_\infty$ from (14). With the previous boundedness statements and the fact that $\ddot{\Theta}_d(t)$ is also bounded, $\Phi \in \mathcal{L}_\infty$ and $\tilde{N}(\cdot) \in \mathcal{L}_\infty$ can be concluded from their definitions. Hence, the control input $V(t) \in \mathcal{L}_\infty$ is also determined from (32). The preceding information can also be used to (9) and (36) to get $$\ddot{\Theta}(t), \dot{r}(t) \in \mathcal{L}_\infty.$$

Now we have explicitly illustrated that all signals in the synchronization trajectory tracking controller and system remain bounded during the closed-loop operation.

From (39), we show that $r(t) \in \mathcal{L}_\infty^2$, $T^T \Xi(t) \in \mathcal{L}_\infty^2$ and $\Xi(t) \in \mathcal{L}_\infty^2$. Hence, $$\lim_{t \to \infty} r(t) = 0 \text{ and } \lim_{t \to \infty} \Xi(t) = 0$$

can be obtained according to Corollary 1.1 in [10]. Furthermore, we can conclude that $$\lim_{t \to \infty} E^*(t), \dot{E}^*(t) = 0$$

using Lemma 1.6 in [10].

When $\Xi(t)=0$, i.e. $\epsilon_i(t)=0$ for $i=1, 2, \ldots, n$, we can know from the synchronization errors in (18, 19) that $$e_1(t)=e_2(t)=\ldots=e_n(t) \quad (40)$$

Also, from the coupled attitude errors in (25, 26) we can get $$e_1^*(t)+e_2^*(t)+\ldots+e_n^*(t)=e_1(t)+e_2(t)+\ldots+e_n(t) \quad (41)$$

Because of $$\lim_{t \to \infty} E^*(t) = 0,$$

we can conclude that $$e_1(t)=e_2(t)=\ldots=e_n(t)=0 \quad (42)$$

From (39) and the above derivation we can know that $\dot{V}(\cdot)=0$ only if $E(t)=0$. Using LaSalle's theorem, $$\lim_{t\to\infty} E(t) = 0.$$

can be concluded. Thus we finally reach $$\lim_{t\to\infty} E(t), \Xi(t) = 0$$

3. Simulations

Simulations are conducted on model consists of four 3-DOF helicopters. The parameters for these 3-DOF helicopters are given in Table 3.

Given the following desired attitude trajectory for all 3-DOF helicopters to track $$\alpha_d(t)=25.0 \sin(0.1\pi t)\text{deg} \quad (43)$$

$$\beta_d(t)=10.0 \sin(0.1\pi t)\text{deg} \quad (44)$$

The control gains are tuned by trial and error until a good trajectory tracking performance is achieved. The gains used in experiments are also given in Table 3.

For comparison between different synchronization errors, three kinds of synchronization strategies are considered: 1) Synchronization Strategy I: The synchronization error and the coupled attitude error are given in Eq. (18) and Eq. (25); 2) Synchronization Strategy II: The synchronization error and the coupled attitude error are given in Eq. (19) and Eq. (26); 3) Synchronization Strategy III: The synchronization error and the coupled attitude error are given in Eq. (20) and Eq. (27). For all simulations, we consider sudden disturbances in mass and moments of inertia appear during simulation. Table 3 lists the values and time instants of these disturbances.

For performance evaluation, we calculate the 2-norms of attitude tracking error $E(t)$ and the standard synchronization error $\Xi_s(t)$, which is chosen to be the same as that in Eq. (18). The calculated results in Table 4 show that the attitude tracking error $E(t)\to 0$ can be realized by using any controllers: without/with synchronization strategies. However, without the synchronization strategy, there will be significant differences between the attitude tracking errors of these four 3-DOF helicopters, i.e. the synchronization errors are large, and the disturbances affect the performance a lot. From Table 4 we know that the maximal 2-norms of synchronization errors for elevation and pitch axes are 0.8025 deg and 0.9543 deg without synchronization strategy. Using the proposed synchronization strategies, the synchronization errors can be remarkably reduced and the effect of disturbances on the synchronization performance has been suppressed well. For the synchronization strategy I, II and III, the corresponding maximal 2-norms have fallen to 0.2772 deg and 0.3040 deg, 0.2170 deg and 0.2443 deg, 0.1888 deg and 0.2095 deg, respectively. The more complicated the synchronization strategy is, the smaller the synchronization error. These results validate the previous expectation. However, the better synchronization performance is obtained at the cost of more on-line computation burden, less reliability, and more control efforts.

In sum, the simulation results on four 3-DOF helicopters demonstrate the effectiveness of the synchronization controller. Further investigation indicates that better synchronization performance can be realized, at the cost of computational burden, and control efforts.

TABLE 3

Parameters and control gains for four 3-DOF helicopters.

| Parameters/gains | I | II | III | IV |
|---|---|---|---|---|
| Moment of inertia $J_{ci}$ | 0.91 | 1.00 | 0.8 | 1.2 |
| Moment of inertia $J_{pi}$ | 0.0364 | 0.045 | 0.04 | 0.05 |
| Mass $m_i$ | 0.051 | 0.061 | 0.071 | 0.081 |
| $J_{ci}$ disturbance | 0.25 | 0.25 | 0.25 | 0.25 |
| $J_{pi}$ disturbance | −0.02 | −0.02 | −0.02 | −0.02 |
| $m_i$ disturbance | 0.015 | 0.015 | 0.015 | 0.015 |
| Time for $J_{ci}$ disturbance on, s | 1.5 | 2.5 | 3.5 | 4.5 |
| Time for $J_{pi}$ disturbance on, s | 1.5 | 2.5 | 3.5 | 4.5 |
| Time for m disturbance on, s | 1.0 | 2.0 | 3.0 | 4.0 |
| $K_{fi}$ | | 0.5 | | |
| $l_{ai}$ | | 0.66 | | |
| $l_{hi}$ | | 0.177 | | |
| Attitude feedback gains, $K_i$ | | diag[9.0 1.0] | | |
| Synchronization feedback gains, $K_{si}$ | | diag[3.0 3.0] | | |
| Control gains, $\Lambda_i$ | | diag[5.0 5.0] | | |
| Synchronization coupling gains, $B_i$ | | diag[3.0 3.0] | | |

TABLE 4

Performance evaluation without/with synchronization strategy, in degrees.

| Errors | I | II | III | IV |
|---|---|---|---|---|
| *No synchronization* | | | | |
| $\|e_\alpha\|_2$ | 1.5490 | 1.3598 | 0.9768 | 1.5010 |
| $\|e_\beta\|_2$ | 0.5816 | 1.1597 | 0.8451 | 0.2138 |
| $\|\epsilon_{s\alpha}\|_2$ | 0.2803 | 0.5799 | 0.8025 | 0.3578 |
| $\|\epsilon_{s\beta}\|_2$ | 0.5898 | 0.3206 | 0.9543 | 0.6850 |
| *Synchronization I* | | | | |
| $\|e_\alpha\|_2$ | 1.2862 | 1.3213 | 1.4350 | 1.3351 |
| $\|e_\beta\|_2$ | 0.5882 | 0.5595 | 0.5558 | 0.7323 |
| $\|\epsilon_{s\alpha}\|_2$ | 0.1657 | 0.2291 | 0.2772 | 0.1170 |
| $\|\epsilon_{s\beta}\|_2$ | 0.1957 | 0.1162 | 0.3040 | 0.2228 |
| *Synchronization II* | | | | |
| $\|e_\alpha\|_2$ | 1.2907 | 1.3576 | 1.4846 | 1.3544 |
| $\|e_\beta\|_2$ | 0.5856 | 0.5115 | 0.5397 | 0.7074 |
| $\|\epsilon_{s\alpha}\|_2$ | 0.1345 | 0.1832 | 0.2170 | 0.1002 |
| $\|\epsilon_{s\beta}\|_2$ | 0.1537 | 0.0686 | 0.2443 | 0.1599 |
| *Synchronization III* | | | | |
| $\|e_\alpha\|_2$ | 1.3181 | 1.3835 | 1.5015 | 1.3675 |
| $\|e_\beta\|_2$ | 0.6336 | 0.5782 | 0.5906 | 0.7391 |
| $\|\epsilon_{s\alpha}\|_2$ | 0.0959 | 0.1600 | 0.1888 | 0.0678 |
| $\|\epsilon_{s\beta}\|_2$ | 0.0842 | 0.0212 | 0.2095 | 0.1463 |

LIST OF REFERENCES

[1] Y. Koren, "Cross-coupled biaxial computer controls for manufacturing systems," ASME Journal of Dynamic Systems, Measurement, and Control, vol. 102, pp. 265-272, 1983.

[2] P. Kulkarni and K. Srinivasan, "Cross-coupled control of biaxial feed drive servomechanisms," ASME Journal of Dynamic Systems, Measurement, and Control, vol. 112, no. 2, 1990.

[3] T. Kamano, T. Suzuki, N. Iuchi, and M. Tomizuka, "Adaptive feedforward controller for synchronization of two axed postitioning system," Transactions of Society of Instrument and Control Engineers (SICE), vol. 29, no. 7, pp. 785-791, 1993.

[4] P. Moore and C. Chen, "Fuzzy logic coupling and synchronized control of multiple independent servo-drives," Control Engineering Practice, vol. 3, no. 12, pp. 1697-1708, 1998.
[5] H. Lee and G. Jeon, "A neuro-controller for synchronization of two motion axes," International Journal of Intelligent Systems, pp. 571-586, 1998.
[6] Jadbabaie, J. Lin, and A. S. Morse, "Coordination of groups of mobile autonomous agents using nearest rules," IEEE Transactions on Automatic Control, vol. 48, pp. 988-1001, June 2003.
[7] J. R. Lawton, R. W. Beard, and B. J. Young, "A decentralized approach to formation maneuvers," IEEE Transactions on Robotics and Automation, vol. 19, no. 6, pp. 933-941, 2003.
[8] Rodriguez-Angeles and H. Nijmeijer, "Mutual synchronization of robots via estimated state feedback: a cooperative approach," IEEE Transactions on Control Systems Technology, vol. 12, pp. 542-554, July 2004.
[9] J. Gudino-Lau, M. A. Arteaga, L. A. Munoz, and V. Parra-Vega, "On the control of cooperative robots without velocity measurement," IEEE Transactions on Control Systems Technology, vol. 12, pp. 600-608, July 2004.
[10] Hugh H. T. Liu and D. Sun, "Uniform synchronization in multi-axis motion control," in Proceedings of the American Control Conference, (Portland, Oreg.), pp. 4537-4542, Jun. 8-10 2005.
[11] J. Shan and Hugh H. T. Liu, "Adaptive attitude synchronization tracking control of multiple UAVs in formation flight," in Proceedings of the American Control Conference, (Portland, Oreg.), pp. 128-133, Jun. 8-10 2005.
[12] Hugh H. T. Liu and S. Nowotny, "Coordinated tracking control of multiple laboratory helicopters: centralized and de-centralized design approaches," in AIAA Guidance, Navigation, and Control Conference and Exhibit, (San Francisco, Calif.), Aug. 15-18 2005.
[13] J. Shan and Hugh H. T. Liu, "Tracking synchronization of multiple 3-DOF experimental helicopters," in AIAA Guidance, Navigation, and Control Conference and Exhibit, (San Francisco, Calif.), Aug. 15-18 2005.
[14] J. Shan and Hugh H. T. Liu, "Development of an experimental testbed for multiple vehicles formation flight control," in Proceedings of IEEE Conference on Control & Applications, (Toronto, Canada), Aug. 28-31 2005.

What is claimed is:

1. A computer implemented method for synchronizing motion for at least two dynamic systems comprising:
   (a) providing a generic motion control synchronization framework in accordance with a computer program linked to a computer device, the generic synchronization framework defining a parameter matrix and a uniform control framework, the generic synchronization framework being operable to perform adaptive control of a plurality of synchronization parameters related to the motion of the at least two dynamic systems having the same or different control applications;
   (b) populating the generic synchronization framework with the synchronization parameters; and
   (c) determining a solution for the parameter matrix adaptively, thereby obtaining a solution for synchronizing motion of the dynamic systems.

2. The method of claim 1 wherein the parameter matrix defines a feasible space in which each member of the parameter matrix is a feasible solution.

3. The method of claim 1, comprising the further step of achieving simultaneous convergence by operation of the parameter matrix.

4. The method of claim 2, wherein the feasible space is searchable for improved or optimal solution(s) for the parameter matrix.

5. The method of claim 1, wherein the synchronization parameters consist of synchronization selections converted into numerical parameters, the numerical parameters including one or numerical values related to the motion of the dynamic systems and/or motion related constraints for the dynamic systems.

6. The method of claim 1, wherein the parameter matrix includes a synchronization parameter consisting of a synchronization error value.

7. The method of claim 1, wherein the parameter matrix includes synchronization parameters consisting of an inertia value and a centrifugal value.

8. The method of claim 1, wherein the parameter matrix includes a synchronization parameter consisting of a Coriolis value.

9. The method of claim 4, comprising the further step of applying one or more numerical optimization methods in order to obtain the improved or optimal solution(s) for the parameter matrix.

10. The method of claim 1, comprising the further step of applying an automated search routine to the parameter matrix to obtain the synchronization solution.

11. The method of claim 1, comprising the further step of applying a numerical computational program to the parameter matrix to obtain the synchronization solution.

12. The method of claim 9, wherein the optimization method is constrained.

13. The method of claim 1, wherein the dynamic systems include vehicles.

14. The method of claim 1, wherein the dynamic systems include robots.

15. The method of claim 1, comprising the further step of initiating a computer program that is operable to establish and process the generic synchronization framework.

16. The method of claim 1, comprising the further step of obtaining control data from the solution of the parameter matrix.

17. The method of claim 16, comprising the further step of providing the control data to one or more of the dynamic systems to achieve motion synchronization.

18. The method of claim 16, comprising the further step of translating the control data into a format that is operable in connection with one or more motion control systems associated with the dynamic systems.

19. The method of claim 18, wherein the one or more motion control systems consist of control applications linked to the dynamic systems.

20. The method of claim 18, wherein the motion control systems consists of one or more navigation systems associated with vehicles.

21. A system for synchronizing motion between at least two dynamic systems, the system comprising:
   (a) a computer device; and
   (b) a computer program linked to the computer device, computer device and computer program being operable to:
      i) define a generic motion control synchronization framework, the generic synchronization framework being operable to establish a parameter matrix and a uniform control framework, the generic synchronization framework being operable to perform adaptive control of a plurality of synchronization parameters related to the motion of the at least two dynamic systems having the same or different control applications;

ii) populate the generic synchronization framework with the synchronization parameters; and iii) determine a solution for the parameter matrix adaptively, thereby obtaining a solution for synchronizing motion of the dynamic systems.

22. The system as claimed in claim 21, wherein the generic synchronization framework is representative of a dynamic model of the dynamic systems to be synchronized.

23. The system as claimed in claim 21, wherein the generic synchronization framework is further operable to calculate synchronization errors based on desired states of the dynamic systems and actual states of the dynamic systems.

24. A computer program product for use on a computer device for synchronizing motion for at least two dynamic systems, the computer program product comprising:

(a) a computer usable medium; and (b) computer readable program code recorded or stored in the computer useable medium, the computer readable program code defining a control application on the computer device that is operable to:

i) define a generic motion control synchronization framework, the generic synchronization framework being operable to establish a parameter matrix and a uniform control framework, the generic synchronization framework being operable to perform adaptive control of a plurality of synchronization parameters related to the motion of the at least two dynamic systems having the same or different control applications;

ii) populate the generic synchronization framework with the synchronization parameters; and iii) determine a solution for the parameter matrix adaptively, thereby obtaining a solution for synchronizing motion of the dynamic systems.

25. The computer program product of claim 24, wherein the control application is operable to apply one or more numerical optimization methods in order to obtain improved or optimal solution(s) for the parameter matrix.

26. The computer program product of claim 24, the control application being operable to provide control data operable on the dynamic systems to achieve motion synchronization.

27. The computer program product of claim 24, wherein the control application is interoperable with one or more motion control systems associated with the dynamic systems.

28. The computer program product as claimed in claim 27, wherein the motion control systems consist of one or more motion control applications or navigation systems associated with the dynamic systems.

29. The computer program product of claim 26, the computer program product being further operable to translate the control data into a format that is operable in connection with one or more motion control systems associated with the dynamic systems.

30. A computer implemented method for synchronizing motion between at least two dynamic systems, comprising the steps of:

(a) developing a dynamic model of the dynamic systems;

(b) obtaining estimates for selected synchronization parameters related to the motion of the dynamic systems, by operation of the dynamic model;

(c) populating a generic motion control synchronization framework with the synchronization parameters in accordance with a computer program linked to a computer device, the generic synchronization framework defining a parameter matrix and a uniform control framework, the generic synchronization framework being operable to perform adaptive control of the synchronization parameters related to the motion of the at least two dynamic systems having the same or different control applications;

(d) calculating selected synchronization errors based on the desired states and the actual states for the dynamic systems; and (e) converting the selected synchronization errors are converted into the parameter matrix and adaptively applying synchronization strategies to the parameter matrix and solving the parameter matrix so as to obtain a solution to the selected synchronization errors.

* * * * *